United States Patent
Vrba

(10) Patent No.: US 12,377,892 B2
(45) Date of Patent: Aug. 5, 2025

(54) VEHICLE MONITORING SYSTEM

(71) Applicant: Westinghouse Air Brake Technologies Corporation, Pittsburgh, PA (US)

(72) Inventor: Matthew Vrba, Marion, IA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 450 days.

(21) Appl. No.: 17/443,483

(22) Filed: Jul. 27, 2021

(65) Prior Publication Data
US 2022/0024503 A1    Jan. 27, 2022

Related U.S. Application Data

(60) Provisional application No. 63/056,874, filed on Jul. 27, 2020.

(51) Int. Cl.
| | |
|---|---|
| B61L 23/04 | (2006.01) |
| B61L 15/00 | (2006.01) |
| B61L 25/02 | (2006.01) |
| B61L 27/40 | (2022.01) |
| G06F 18/22 | (2023.01) |
| G06V 10/56 | (2022.01) |
| G06V 20/56 | (2022.01) |

(52) U.S. Cl.
CPC ........... *B61L 25/02* (2013.01); *B61L 15/0058* (2024.01); *B61L 27/40* (2022.01); *G06F 18/22* (2023.01); *G06V 10/56* (2022.01); *G06V 20/56* (2022.01)

(58) Field of Classification Search
CPC .......... B16L 23/04; B16L 25/02; B61L 23/04; B61L 25/02
See application file for complete search history.

(56) References Cited

U.S. PATENT DOCUMENTS

| | | | | |
|---|---|---|---|---|
| 9,979,934 | B1* | 5/2018 | Breiholz | G01W 1/18 |
| 2014/0297168 | A1* | 10/2014 | Ovens | G08G 5/51 |
| | | | | 701/120 |
| 2015/0235094 | A1* | 8/2015 | Kraeling | G06F 18/21 |
| | | | | 348/148 |
| 2015/0268172 | A1* | 9/2015 | Naithani | B61L 25/025 |
| | | | | 348/129 |
| 2015/0269722 | A1* | 9/2015 | Naithani | G06V 20/588 |
| | | | | 382/104 |
| 2016/0001780 | A1* | 1/2016 | Lee | B60R 1/31 |
| | | | | 348/46 |
| 2017/0255824 | A1* | 9/2017 | Miller | H04L 67/12 |
| 2018/0151072 | A1* | 5/2018 | Altinger | G08G 1/04 |
| 2018/0283895 | A1 | 10/2018 | Aikin | |
| 2019/0146520 | A1* | 5/2019 | Naithani | B61L 23/042 |
| | | | | 701/28 |
| 2019/0311621 | A1* | 10/2019 | Pedersen | B60W 30/0956 |
| 2019/0385025 | A1* | 12/2019 | McMichael | G06V 10/82 |
| 2020/0143173 | A1* | 5/2020 | Kurz | G06V 20/56 |
| 2021/0406559 | A1* | 12/2021 | Efland | G01C 21/3878 |

OTHER PUBLICATIONS

Office Action mailed Jan. 21, 2023 for corresponding Canadian Patent Application No. 3,126,118 (8 pages).

* cited by examiner

*Primary Examiner* — Long T Tran
(74) *Attorney, Agent, or Firm* — K&L Gates LLP

(57) ABSTRACT

A method is provided that may include obtaining image data related to a route from a imaging device associated with a vehicle. The method may also include determining an environmental condition based on the image data, and operating the vehicle or communicating an alert signal based on the environmental condition that is determined.

26 Claims, 2 Drawing Sheets

VEHICLE MONITORING SYSTEM

CROSS-REFERENCE TO RELATED APPLICATIONS

This application claim priority to U.S. Provisional Application No. 63/056,874 entitled Vehicle Monitoring System filed Jul. 27, 2020, hereby incorporated by reference herein.

BACKGROUND

Technical Field

The subject matter described relates to a monitoring system for determining a location of a vehicle.

Discussion of Art

Vehicle monitoring systems may be used to determine the location of a vehicle. Often global navigation satellite systems, including global positioning systems (GPSes) are used to determine the location of a vehicle. The global navigation satellite system may be part of a navigation system of the vehicle, or a standalone device that may be placed in the vehicle.

Often, especially in relation to vehicle systems, environmental conditions of a route may be detected by a monitoring system. While the such monitoring may assist a driver or operator in making decisions, such determinations by the driver or operator have limitation. For example, a vehicle camera may be used by an operator to assist in seeing behind or to the side of a vehicle, or be forward facing to portions of a route that may be difficult for an operator to see as a result of the vehicle system using the camera. For example, rail vehicle may use high definition cameras, infrared cameras, LIDAR, RADAR, or the like to detect potential obstacles for the vehicle. To this end, such cameras may be used when weather conditions result in difficult to see environments, including heavy rain, fog, or the like. Still, these cameras only assist an operator of a vehicle, where often, the camera is unable to provide information to the operator quick enough to take evasive actions. For example, when water covers a track of a rail vehicle during a heavy rain, the camera may be able to detect the standing water before the operator, but not in time to effectively slow the rail vehicle to a safe speed, or to a stop to mitigate the danger of the standing water.

BRIEF DESCRIPTION

In one or more embodiments, a method is provided that may include obtaining image data related to a route from a imaging device associated with a vehicle, determining an environmental condition based on the image data, and operating the vehicle or communicating an alert signal based on the environmental condition that is determined.

In one or more embodiments, a system is provided that may include a monitoring system including at least one imaging device that is configured to be disposed within a vehicle and positioned to capture image data related to a route of the vehicle. The system may also include one or more processors configured to obtain image data related to a route from a imaging device associated with the vehicle, determine an environmental condition based on the image data, and operate the vehicle or communicate an alert signal based on the environmental condition determined.

In one or more embodiments, a system is provided that may include a monitoring system including at least one imaging device that is configured to be disposed within a vehicle and positioned to capture image data related to a route of the vehicle. The system may also include one or more processors configured to obtain image data related to a route from an imaging device associated with the vehicle, and select a first image of the route from the image data. The one or more processors may also be configured to obtain a second image of the route from a route database, compare the first image of the route to the second image of the route, and determine an environmental condition based on the image data.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a monitoring system that obtains image data to determine a hazardous condition or environmental condition related to the vehicle. The environmental conditions may be related to a route a vehicle is traveling, and may include such conditions as weather, washouts, floods, damaged routes, vehicle collisions, vehicle breakdowns, etc. By taking real-time image data, one or more processors may analyze the image data through image comparisons, computer vision, or the like, to make determinations related to the environmental condition. The system may also be in communication with local or remote communication systems, including positive vehicle control (PVC) systems to communicate alerts and information regarding the environmental condition.

A PVC system is a monitoring system utilized by a vehicle system to allow the vehicle system to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle monitoring systems where a vehicle is allowed to move unless a signal (restricting movement) is received.

Figure 1:
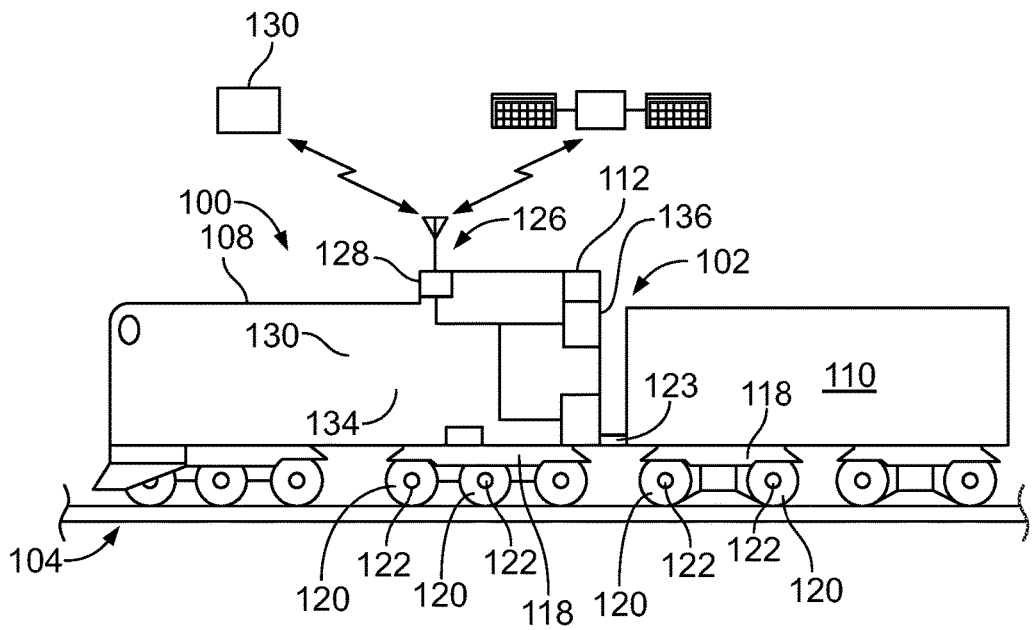
FIG. 1 illustrates a schematic diagram of a vehicle system.

FIG. 1 illustrates a illustrates a schematic diagram of a monitoring system 100 according to an embodiment. The monitoring system may be disposed on a vehicle system 102. The vehicle system may be configured to travel along a route 104 on a trip from a starting or departure location to a destination or arrival location. The route may be a road (e.g., multi-lane highway or other road), track, rail, air space, waterway, etc. The vehicle system includes a propulsion-generating vehicle 108 and optionally one or more non-propulsion-generating vehicles 110 that are mechanically interconnected to one another to travel together along the route. The vehicle system may include at least one propulsion-generating vehicle and optionally, one or more nonpropulsion-generating vehicles. In one example, the single vehicle may be a truck or an off-road vehicle.

The propulsion-generating vehicle may be configured to generate tractive efforts to propel (for example, pull or push) the non-propulsion-generating vehicle along the route. The propulsion-generating vehicle includes a propulsion subsystem, including one or more traction motors, that generates tractive effort to propel the vehicle system. The propulsion-generating vehicle may be referred to herein as a propulsion vehicle, and the non-propulsion-generating vehicle may be referred to herein as a car. Although one propulsion vehicle and one car are shown in FIG. 1, the vehicle system may include multiple propulsion vehicles and/or multiple cars. In an alternative embodiment, the vehicle system only includes the propulsion vehicle such that the propulsion vehicle is not coupled to the car or another kind of vehicle. In one example, one of the propulsion vehicles may be a lead vehicle in a multi-vehicle system, where other vehicles are remote vehicles of the multi-vehicle system. In particular, the remote vehicles may be propulsion generating vehicles or non-propulsion generating vehicles.

The monitoring system monitors the location and movements of the vehicle system. The monitoring system may include an imaging device 112 that in an example is a camera. Specifically, the imaging device may be a video camera, infrared camera, high resolution camera, radar, lidar, or the like. The imaging device may be positioned to obtain image data associated with only a route, an operator and the route, the interior of the vehicle system and the route, or the like. In the illustrated embodiment, the monitoring system may be disposed entirely on the propulsion vehicle. In other embodiments, however, one or more components of the monitoring system may be distributed among several vehicles, such as the vehicles that make up the vehicle system. For example, some components may be distributed among two or more propulsion vehicles that are coupled together in a group or consist. In an alternative embodiment, at least some of the components of the monitoring system may be located remotely from the vehicle system, such as at a dispatch location. The remote components of the monitoring system may communicate with the vehicle system (and with components of the monitoring system disposed thereon).

In the illustrated embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

The vehicles in a vehicle system may be mechanically coupled with each other, such as by couplers. For example, the propulsion vehicle can be mechanically coupled to the car by a coupler 123. Alternatively, the vehicles in a vehicle system may not be mechanically coupled with each other, but may be logically coupled with each other. For example, the vehicles may be logically coupled with each other by the vehicles communicating with each other to coordinate the movements of the vehicles with each other so that the vehicles travel together in a convoy or group as the vehicle system.

The monitoring system may further include a communication system 126 that includes a lead communication assembly 128 and a remote communication assembly 130. The lead communication assembly may be on-board a lead vehicle, that in one example is a propulsion vehicle. The remote communication assembly may be on a remote vehicle, that can be a propulsion vehicle or non-propulsion vehicle, or at a location remote of the vehicle, such as at a dispatch. The monitoring system may include a line 132 that extends from the lead communication assembly to the remote communication assembly. By providing the line, the lead communication assembly may communicate with the remote communication assembly over-the-wire, based on a distributed power system. The monitoring system may also communicate with the remote communication assembly over-the-air, or wirelessly, based on a radio frequency. Optionally, the configuration information about the vehicle system can be communicated via the wired connection to set up the wireless connection. As an example, road numbers, vehicle location within the vehicle system, or the like, may be shared by the wire connection to assist in the wireless connection being located and activated.

The monitoring system may have a controller 136, or control unit, that may be a hardware and/or software system which operates to perform one or more functions for the vehicle system. The controller receives information from components of the monitoring system such as the imaging device, analyzes the received information, and generates communication signals.

Figure 2:
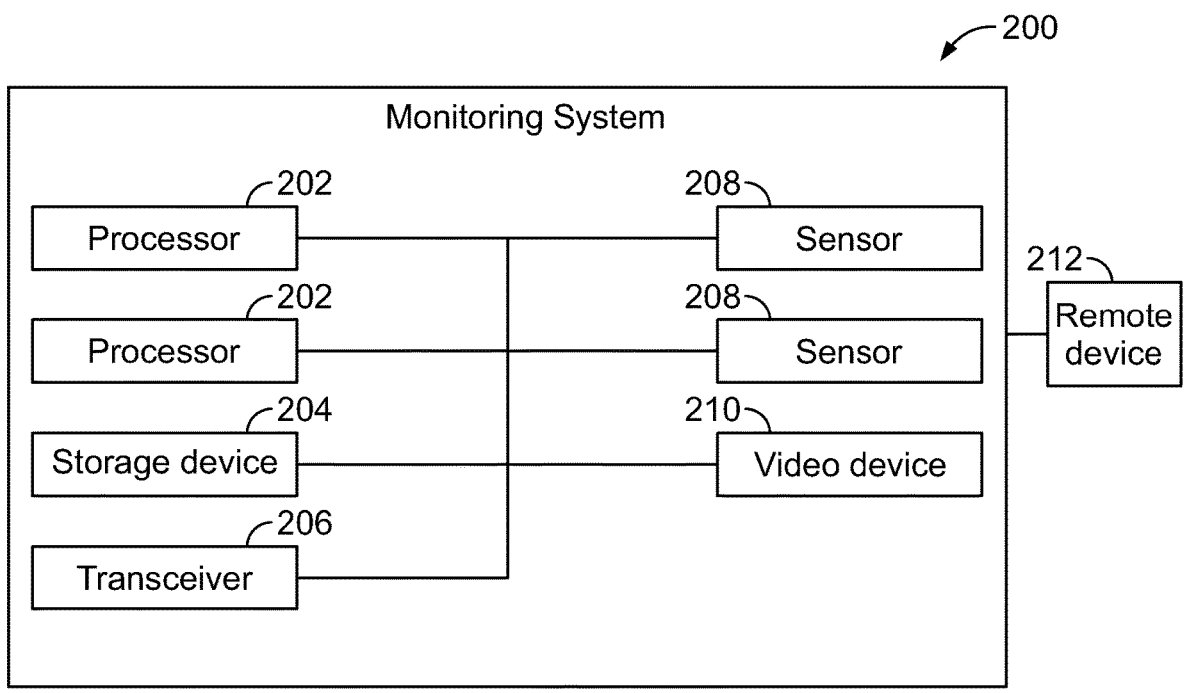
FIG. 2 illustrates a schematic diagram of a monitoring system.

FIG. 2 illustrates a monitoring system 200 that in one example is the monitoring system of FIG. 1. The monitoring system may include one or more processors 202, a storage device 204 such as a memory, a transceiver 206, one or more sensors 208, and at least one imaging device 210. The transceiver may be in communication with a remote device 212, including other vehicle devices, dispatch devices, etc. The one or more sensors may include sensors that detect rain, moisture, wind conditions, exterior temperature, lightening, sound, and may be a thermometer, barometer, accelerometer, audio recording device, camera, light sensor, etc. The imaging device in one example may be disposed on a lead locomotive of a rail vehicle. Alternatively, the imaging device may be in a lead vehicle of a fleet of vehicles. In another example, the imaging device may be on an end vehicle, including on an end of vehicle device. In other embodiments, a first imaging device may be on a lead vehicle, while a second imaging device is on an end vehicle. Alternatively, either the first and/or second imaging device may be on an intermediate vehicle between the front vehicle and end vehicle. Image data from both the first and second imaging device may then be utilized to analyze for environmental condition determinations.

Figure 3:
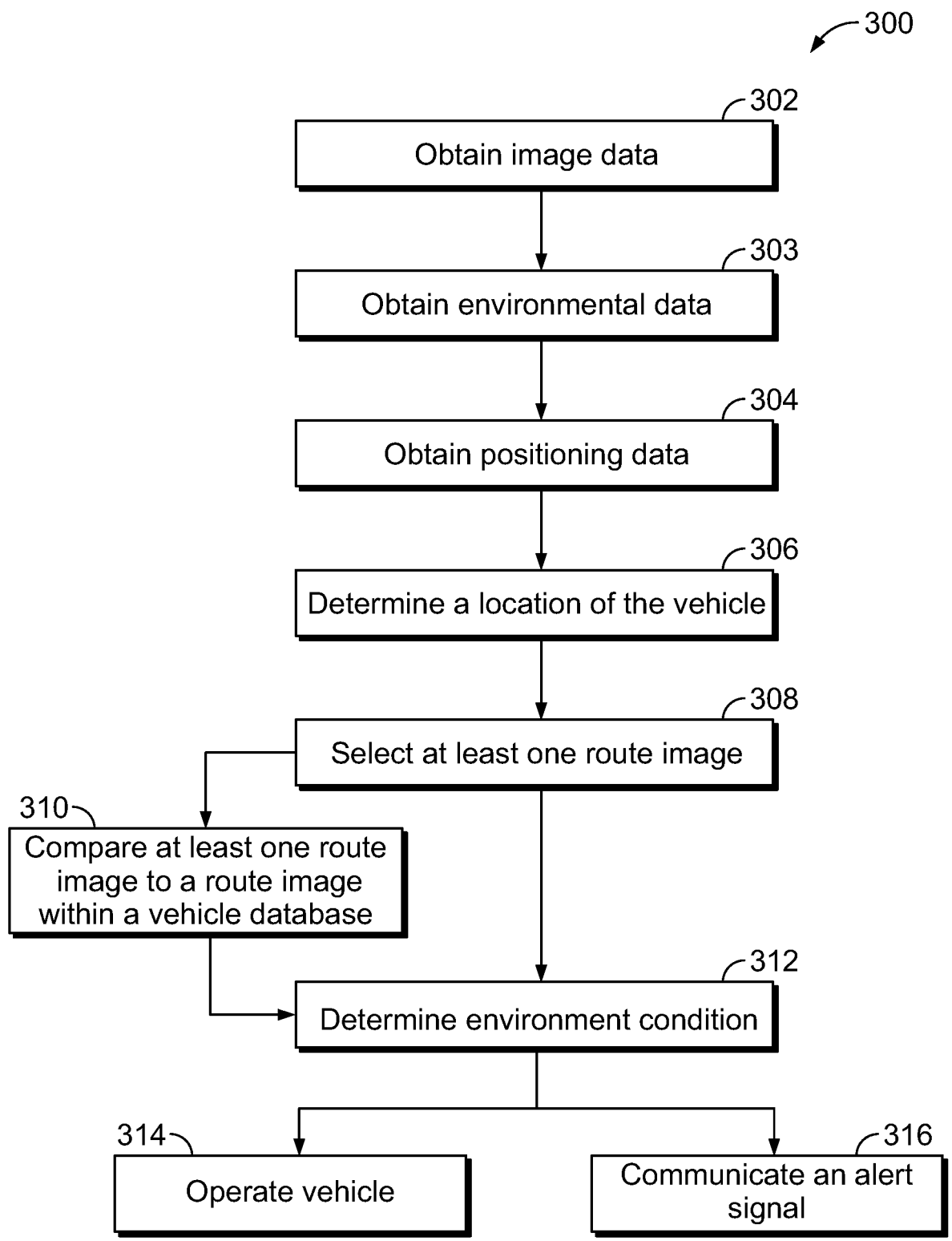
FIG. 3 illustrates a method of determining and alerting of an environmental condition associated with a route.

FIG. 3 illustrates a method 300 for determining and alerting of an environmental condition associated with a route. An environmental condition may include any condition caused by or resulting from the environment. Example environmental conditions on a route include standing water on the route including water above rails for rail vehicles and on a road for road-based vehicles, flooding on the route, destruction or damage of the route including to roads, rails, bridges, culverts, etc., weather conditions, etc., snowdrifts, debris, storms, or the like Weather conditions may include rain or storm conditions, fog condition, other conditions that result in reduced visibility, wind conditions, lightning conditions, mudslide conditions, ice conditions, snow conditions, or the like. A route may be any path that a vehicle may traverse, and may include a road, rail, runway, waterway, passageway, etc.

At 302, image data related to a route is obtained from an imaging device associated with a vehicle. In an example, the imaging device that is a frontwardly facing video camera on the front vehicle of a vehicle system that includes plural vehicles. In one embodiment, the vehicle system is a rail vehicle, and the lead vehicle may be a locomotive. In other embodiments, the imaging device is a video camera that obtains image data associated with the operator of the vehicle, and additionally the environment exterior to the vehicle. In other examples, the imaging device may be an infrared camera, LIDAR, RADAR, heat detecting device, or the like. In yet another embodiment, the imaging device is located on an end of vehicle device at the end of a vehicle system. In other examples, a first imaging device may be at the front of a vehicle system while a second imaging device may be at the end of a vehicle system.

The image data may be obtained from accessing memory of the imaging device, receiving the data, signals, information, etc. over a wireless communications link between the imaging device and a controller of a monitoring system, receiving the data, signals, information, etc. at a server over a network connection, or the like. The obtaining operation, when from the perspective of an imaging device, may include sensing new signals in real time, and/or accessing memory to read stored data, signals, information, etc. from memory within the imaging device or related controller of a monitoring system. The obtaining operation, when from the perspective of a controller of a monitoring device, includes receiving the data, signals, information, etc. at a transceiver of the controller of the monitoring device where the data, signals, information, etc. are communicated from a imaging device.

At 303, environmental data related to a route is obtained from one or more sensors. The environmental data may include moisture content, rain content, snow content, or other precipitation in the air, temperature, atmospheric pressure, wind speed, water levels on the ground, sound data, including that of thunder, electrical data, etc. The environmental data may be used to determine weather, and/or general conditions of the environment outside of the vehicle. The environmental data may be obtained to determine when to obtain image data, or used in association with image data to make determinations related to the environmental conditions exterior to the vehicle.

At 304, positioning data is obtained. In one example, the positioning data is obtained from a global navigation satellite. In one example, the global navigation satellite is a global positioning system (GPS) that provides positioning data of the system on the earth. This includes by providing positioning data that is, or is related to longitude and latitude, a place on a map, a position on a road, a distance from a monument or other marker, or the like. In particular, the positioning data either provides such information, or may be used to determine such information through calculation, algorithm, look-up table, decision tree, function, etc. The positioning data may be obtained from signals received from satellites, wayside devices, over a wire communication device, over the air communication device, Balise, a beacon, cell tower ID, PVC, etc.

At 306, a location of the vehicle is determined based on the positioning data. Again, the determination may be directly provided by or within the positioning data, or may be derived, calculated, or the like from the obtained positioning data.

At 308, at least one route image is selected from the image data. Specifically, in one example, an imaging device monitors the environment exterior to a vehicle, and at least one route image obtained is selected for analysis. In one embodiment, the imaging device continuously or repeatedly monitors the exterior environment of the vehicle and all or at least some of the image data is selected for analysis. Continuously or repeatedly monitoring may include continuous still photographs or images, with a determined time between each image captured. Continuously may also include an imaging device that continuously operates, where an image capture or image analyzed is only a portion of the image data captured through the continuous operation.

In another embodiment, the imaging device only monitors the exterior environment when manually actuated by an operator to begin recording and analyzing image data. In yet another embodiment, a sensor, auxiliary device, etc. may be provided to determine a condition that triggers recording image data of the imaging device, or selecting the portion of the image data to be analyzed. In one example, a sensor may monitor for rain, and when rain is detected, image data is recorded and analyzed. A sudden drop in temperature, or reduction in speed may also trigger recording and analyzing the image data. A determined mileage into a trip may also trigger the image data recording and analysis. Still, in each instance, a route image, or images are selected, and recorded for analysis.

At 310, optionally, at least one route image, is compared to a route image within a route database. Specifically, the route database may include images of the route upon which the vehicle is traveling. When an environmental condition such as a washed out track, flooding, mud or land slide, or the like is detected, the obtained image data may differ from the images in the route database, indicating potentially hazardous conditions. By comparing the route from the obtained image data to a route within the route database, similarities or differences between the image data and corresponding images may be determined. These similarities or differences may then be used to determine if an environmental condition is present. In one example an imaging algorithm may be used, and based on a percentage of similarities, the environmental condition may be determined. In one example, if the similarities are above a threshold percentage, the environmental condition is considered to be determined. Alternatively, a lookup table, decision tree, mathematical equation, mathematical function, or the like may be used to make the determination.

Alternatively, in other embodiments, instead of, or in addition to, the route images, a route database may include images of environmental conditions associated with a route. So, in one example, an image of a flooded track may be provided. The image data obtained, can then be compared to the flooded track to determine if enough similar are provided to indicate the environmental condition is present. One or more processors may have imaging software that may count pixels, determine consistency, or the like that may be used during a comparison to make determinations regarding the condition of the route.

At 312, a determination is made regarding whether an environmental condition is presented based in part on the image data. In one embodiment, both image data and environmental data is utilized in determining whether an environmental condition is presented. Determinations may be made utilizing an algorithm, mathematical equation, mathematical model, mathematical function, look up table, decision tree, etc. Such determinations may be made solely based on the selected image data without comparing the image data to another image of the route, or to an image of an environmental condition. To this end, the determination may be made based only on analyzing characteristics of the image data. When determining based only on analyzing characteristics of the image data, in one example, an algorithm may be used based on the image characteristics such as pixel count, coloring, image shapes, layering, or the like to identify an environmental condition. Alternatively, the analyzed characteristics may be identified from determined characteristics associated with the environmental condition. In any of these manners, or in additional manners, the environmental condition may be determined without comparison to stored image data. In other embodiments, the determination is made only by using a comparison of the image data to stored image data. In yet another example, both analysis of image data, and comparison of the image data to a stored image data may be utilized to make the determination of the environmental condition.

In one example a PVC device may process received images to detect if any known characteristics appear to exist. The process of detection may use a combination of techniques, including searching for a known definition of specific conditions or characteristics and offline machine learning where a learning algorithm can be trained with known images that show a specific characteristic or condition that results in an algorithm that can detect similar characteristics or conditions that occur and classify them as an environmental condition that may be considered unusual. Once the PVC device detects the environmental condition, the environmental condition may be classified, and logged.

In an embodiment, based on the image data of the route obtained compared to image data stored in a route database, differences in the route may be determined. In addition, the one or more processors may include software to determine the environmental condition of the route. In one embodiment, an algorithm may be provided to count the number of pixels in the image, and based on pixels, image colors, and changes of color throughout the image, the environmental condition may be determined. For example, the image of standing water may have a determined hue and pixel count that are used to determine a road is flooded using an algorithm. Alternatively, an image of a roadway may have pothole that is identified as determined by hues of individual pixels. Specifically, a pothole may be identified as a having numerous pixels of black hue that then transition to the gray hue of a roadway. Thus, an algorithm may take a historical image and determine the pixel count per the area of the historical image, and convert the image captured by the imaging device to the same number of pixel count per area. Then, the hues of each pixel may be compared. Alternatively, the change in hues of pixels at the perimeter of each pothole may be examined to determine if matching hue changes per pixel in a localized area may be provided between the historical image and the captured image.

In another example, images of environmental conditions are stored in the route database, and the image data obtained may be compared to the stored images. A comparison program may be utilized to determine similarities between the compared image data to determine the environmental condition. Thus, environmental data from sensors may indicate that a flash flood rain is occurring presenting conditions for a mudslide. A mudslide across a rail would show the rail covered by brown mud. The image data in the route database may similarly show a rail covered by brown mud. Based on these similarities, the mudslide may be determined. If no environmental condition is determined present at 312, image data may continue to be obtained to continually make environmental condition determinations during a trip.

In another example, dissimilarities in image data results in a determination of an environmental condition. Specifically, when a mudslide or debris is present on a route, a historical image of the route when no mud or debris is on the route is compared to image data when mud and debris is on the route. Based on the dissimilarities in the image data, the determination that the route is covered in mud and/or debris is made. Additionally, in other examples, snow, ice, flooded tracks, etc. may cause captured image data to differ from historical image data.

At 314, when a determination is made that an environmental condition is present on a route, optionally, the vehicle may be operated in response to the determination. Specifically, a defined set of actions may be undertaken based on the environmental condition detected. In this manner, the vehicle may be guided by a PVC system by rules established for such environmental conditions. For example, if water is standing on a train track, the vehicle may be guided to slow or stop. In another example, the detection of ice on a route of a vehicle may cause the vehicle to not be operated above a determined safe vehicle speed to prevent sliding of the vehicle on the ice.

In one example, when an environmental condition such as a wash out or mudslide is determined, the vehicle may be braked and stopped to avoid the environmental condition. Alternatively, a state of a nearby light, switch, or another wayside device may be actuated to reroute the vehicle, or reroute another vehicle taking the same route. In other embodiments, such as when standing water is detected, the vehicle may be slowed to pass through the water at a safer speed. Because the system may detect and determine the environmental conditions before an operator can observe the environmental conditions, evasive maneuvers may be undertaken by the operator faster than if just relying on an operator. Additionally, for some vehicles, such as rail vehicles, seeing the route may be difficult during poor weather conditions, such that an imaging device may be able to detect an environmental condition such as standing water when an operator cannot, or does not. Similarly, environmental conditions could be missed by an operator who is tired, or not paying attention, thus eliminating human error. In these manners, improved functioning is provided.

At 316, optionally when a determination is made that an environmental condition is present on a route, an alert signal is communicated based on the environmental condition that is determined. In addition to, or instead of maneuvering the vehicle in response determining an environmental condition is present, an alert signal may be communicated from the vehicle to a remote device.

The alert signal may include an auditory sound, flashing, or the like to bring attention to the alert signal. The alert signal may indicate the route determined, the name of the route determined, the position of the route determined, etc. along with an indication of the environmental condition determined. In one embodiment, the determination is made by an onboard PVC system that communicates the determined environmental condition to remote devices, including a dispatcher device, other vehicles that are expected to travel the same route, etc. In this manner, other vehicles may be alerted that an environmental condition is present, the vehicle has stopped or slowed, etc. The other vehicles may be rerouted, change speeds, etc. to avoid the environmental condition. Additionally, such notification may be used to schedule repair work on the route to fix damage caused by the environmental condition, or potential maintenance or cleaning of the vehicle.

For example, a large pothole requiring an automobile to slow down, or steer around may be determined that may need to be repaired. Alternatively, a powerline may be down by a rail of a rail vehicle that does not cause stoppage of the rail vehicle, but poses a threat of electrocution by those in the area. Because the downed line may be detected, the electric company may be contacted to fix the dangerous environmental condition. In this manner, an onboard imaging device may be used to maneuver a vehicle and/or warn other vehicles and individuals of a dangerous environmental condition that otherwise would not have been detected. Consequently, safety is improved by using the system and methodology.

In one or more embodiments, a method is provided that may include obtaining image data related to a route from a imaging device associated with a vehicle, determining an environmental condition based on the image data, and operating the vehicle or communicating an alert signal based on the environmental condition that is determined.

Optionally, determining the environmental condition may include analyzing characteristics of the image data, and identifying the characteristics that match with determined characteristics associated with the environmental condition. In one aspect, the characteristics may include at least one of pixel count, image shapes, or image colors.

Optionally, determining the environmental condition may include selecting at least one route image from the image data, comparing the at least one route image to a route image within at least one route database, determining similarities between the at least one route image and the route image within the at least one route database, and determining the environmental condition based on the similarities. In one example, communicating the alert signal may include one of communicating the alert signal to a remote device, or communicating the alert signal to a vehicle device.

In one or more embodiments, a system is provided that may include a monitoring system including at least one imaging device that is configured to be disposed within a vehicle and positioned to capture image data related to a route of the vehicle. The system may also include one or more processors configured to obtain image data related to a route from a imaging device associated with the vehicle, determine an environmental condition based on the image data, and operate the vehicle or communicate an alert signal based on the environmental condition determined.

Optionally, to determine the environmental condition the one or more processors are configured to select at least one image from the image data, compare the at least one route image to a route image within a route database, determine similarities between the at least one route image and the route image within the route database, and determine the environmental condition based on the similarities. In another aspect, the one or more processors are further configured to obtain position data from a global navigation satellite, and select the route database based on the position data. In one example, the route database may be remote from the vehicle. In another aspect, the route may be one of a road or a rail.

Optionally, the environmental condition may be standing water on the route, flooding on the route, or destruction of the route. In another aspect, the environmental condition may be a weather condition. In another example, the weather condition may be one of rain condition, wind condition, lightening condition, mudslide condition, ice condition, or snow condition. In yet another aspect, to communicate the alert signal the one or more processors may be further configured to communicate the alert signal to a remote device, or communicate the alert signal to a vehicle device.

Optionally, the one or more processors may further be configured to display the environmental condition determined on a display. In another aspect, the vehicle may be a multi-car vehicle and the imaging device is mounted on one of a front vehicle or end vehicle of the multi-car vehicle.

In one or more embodiments, a system is provided that may include a monitoring system including at least one imaging device that is configured to be disposed within a vehicle and positioned to capture image data related to a route of the vehicle. The system may also include one or more processors configured to obtain image data related to a route from an imaging device associated with the vehicle, and select a first image of the route from the image data. The one or more processors may also be configured to obtain a second image of the route from a route database, compare the first image of the route to the second image of the route, and determine an environmental condition based on the image data.

Optionally, the environmental condition may be standing water on the route, flooding on the route, or destruction of the route. In one aspect, the environmental condition may be a weather condition. In another example, the weather condition may be one of rain condition, wind condition, lightening condition, mudslide condition, ice condition, or snow condition.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device, and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related.

Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   obtaining environmental data related to a route from a sensor;
   obtaining image data related to the route from an imaging device disposed onboard a vehicle, the image data depicting an environment in which the vehicle moves;
   determining a current weather condition of the environment based at least in part on the image data and the environmental data; and
   one or more of controlling operation of the vehicle or communicating an alert signal based on the current weather condition that is determined,
   wherein determining the current weather condition comprises:
      selecting at least one route image from the image data; and
      comparing the at least one route image to a route image within at least one route database.

2. The method of claim 1, wherein determining the current weather condition comprises:
   analyzing characteristics of the image data; and
   identifying the characteristics that match determined characteristics associated with the current weather condition.

3. The method of claim 2, wherein the characteristics include at least one of pixel count, image shapes, or image colors.

4. The method of claim 1, wherein determining the current weather condition further comprises:
   determining similarities or dissimilarities between the at least one route image and the route image within the at least one route database; and
   determining the current weather condition based on the similarities or the dissimilarities.

5. The method of claim 1, wherein communicating the alert signal includes one of communicating the alert signal to a remote device or communicating the alert signal to a vehicle device.

6. The method of claim 1, wherein the environmental data comprises at least one of a moisture content, an atmospheric pressure, a wind speed, or sound data, or combinations thereof.

7. The method of claim 1, wherein the the environmental data is used to determine when to obtain the image data.

8. The method of claim 1, further comprising obtaining an alert associated with the current weather condition from a positive vehicle control system.

9. The method of claim 1, wherein determination of the current weather condition is performed by a positive vehicle control system.

10. The method of claim 9, wherein, upon determination of the current weather condition, the positive vehicle control system logs the current weather condition.

11. The method of claim 9, further comprising determining, via the positive vehicle control system, a defined set of actions based on the environmental condition, and wherein controlling operation of the vehicle is based on the defined set of actions.

12. The method of claim 9, further comprising transmitting, via the positive vehicle control system, the alert signal to a remote device.

13. The method of claim 12, wherein the remote device comprises a dispatcher device or a second vehicle expected to travel the route.

14. A system comprising:
    a sensor configured to generate environmental data;
    a monitoring system including at least one imaging device configured to be disposed onboard a vehicle and positioned to capture image data related to a route of the vehicle, the image data depicting an environment in which the vehicle moves;
    one or more processors configured to:
       obtain the environmental data from the sensor;
       obtain the image data related to the route from the at least one imaging device disposed onboard the vehicle;
       determine a current weather condition of the environment based on the image data depicting the environment and the environmental data; and
       one or more of control operation of the vehicle or communicate an alert signal based on the current weather condition that is determined;
       wherein to determine the current weather condition the one or more processors are configured to:
          select at least one route image from the image data; and
          compare the at least one route image to a route image within a route database.

15. The system of claim 14, wherein the one or more processors are configured to:
    determine similarities or dissimilarities between the at least one route image and the route image within the route database; and
    determine the current weather condition based on the similarities or the dissimilarities between the at least one route image and the route image within the route database.

16. The system of claim 14, wherein the one or more processors are configured to:
    obtain position data from a global navigation satellite; and
    select the route database based on the position data.

17. The system of claim 14, wherein the route database is remote from the vehicle.

18. The system of claim 14, wherein the route is one of a road or a rail.

19. The system of claim 14, wherein the current weather condition has caused one or more of standing water on the route, flooding on the route, or destruction of the route.

20. The system of claim 14, wherein the current weather condition is one or more of a rain condition, a wind condition, a lightning condition, a mudslide condition, an ice condition, or a snow condition.

21. The system of claim 14, wherein the one or more processors are configured to communicate the alert signal to a remote device or communicate the alert signal to a vehicle device.

22. The system of claim 14, wherein the vehicle is one of a front vehicle or an end vehicle of a vehicle system that includes multiple vehicles and the at least one imaging device is mounted on one of the front vehicle or the end vehicle.

23. A system comprising:
   a sensor configured to generate environmental data;
   a monitoring system including at least one imaging device that disposed onboard a vehicle and positioned to capture image data related to a route of the vehicle, the image data depicting an environment in which the vehicle moves;
   one or more processors configured to:
      obtain the environmental data from the sensor;
      obtain the image data related to the route with the at least one imaging device disposed onboard the vehicle;
      select a first image of the route from the image data;
      obtain a second image of the route from a route database;
      compare the first image of the route to the second image of the route; and
      determine a current weather condition of the environment in which the vehicle is moving based on the image data depicting the environment and the environmental data.

24. The system of claim 23, wherein the one or more processors are configured to:
   determine similarities or dissimilarities between the first image of the route and the second image of the route; and
   determine the current weather condition based on the similarities or the dissimilarities between the first image of the route and the second image of the route.

25. The system of claim 23, wherein the current weather condition has caused one or more of standing water on the route, flooding on the route, or destruction of the route.

26. The system of claim 23, wherein the current weather condition is one or more of a rain condition, a wind condition, a lightning condition, a mudslide condition, an ice condition, or a snow condition.

* * * * *